Jan. 15, 1929. 1,699,196

M. KRISTOFFERSSON

FOAM DESTROYING DEVICE

Filed May 2, 1927 2 Sheets-Sheet 1

INVENTOR
M. KRISTOFFERSSON

Jan. 15, 1929.

M. KRISTOFFERSSON 1,699,196

FOAM DESTROYING DEVICE

Filed May 2, 1927    2 Sheets-Sheet 2

INVENTOR
M. KRISTOFFERSSON,
BY Jno Imirie
ATTY.

Patented Jan. 15, 1929.

1,699,196

UNITED STATES PATENT OFFICE.

MAGNUS KRISTOFFERSSON, OF LIMHAMN, SWEDEN.

FOAM-DESTROYING DEVICE.

Application filed May 2, 1927, Serial No. 188,337, and in Sweden May 6, 1926.

When skimmed milk in dairies is to be transferred from one receptacle to another, great amounts of foam are formed, which involves disadvantages of many kinds and also economical losses, in that the foam is so permanent that it only with the greatest difficulty can be reduced into liquid and in itself is worthless as salable goods.

The object of the invention is to provide a device for preventing the formation of foam or with other words a device for damping or destroying the foam in the same degree as it tends to be formed, and one of the chief advantages of the invention is that no movable parts whatsoever, which would require motive power, are necessary for the operation of the device which all the same works most effectively for the contemplated purpose.

The invention is illustrated by way of example in a couple of embodiments in the accompanying drawings in which.

Figure 3:
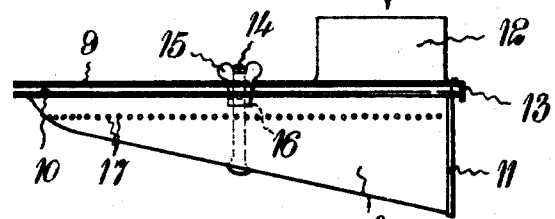
Figures 3 and 4 show in a similar manner the second form of embodiment.
Figure 4:
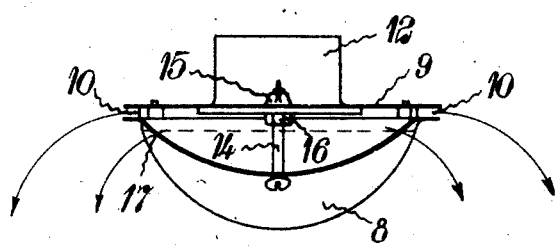

One instance at which foam may be produced in the dairies occurs, when the skimmed milk after the separation is to be weighed and to be returned in corresponding proportion to the suppliers of whole milk, for which purpose the skimmed milk is pumped into an open receptacle placed on a scale. And it is principally in this connection the device according to the invention is to be utilized, although of course it may also be applied for other purposes. In any case the form of the device should agree somewhat with the form of the receptacle into which the skimmed milk is to be supplied, and the form as represented by Figs. 1, 2 and 5 is suitable for a receptacle of extending rectangular shape, while the form as represented by Figs. 3, 4 and 6 is more suitable for a receptacle having substantially square form.

The characteristic feature common for both forms of embodiment of the device according to the invention consists in that the device is constituted by a lower cup shaped part above which a cover preferably provided with an inlet is arranged in such a manner that between the edge of the said cover and the edge of the cup shaped lower part there is formed an extending and substantially horizontal discharge slot through which the milk is forced to run out substantially horizontally in a relatively thin skin which is spread on top of the underlying milk layer and thereby presses possibly existing foam down and incorporates this latter into the milk mass. It will be readily understood that the foam-destroyer should have a form substantially in agreement with the receptacle in which it is to work, so that it will be able to spread the milk skin about the largest possible surface and prevent thereby the foam from collecting at such places of the surface, which the discharged milk skin cannot reach.

Figure 1:
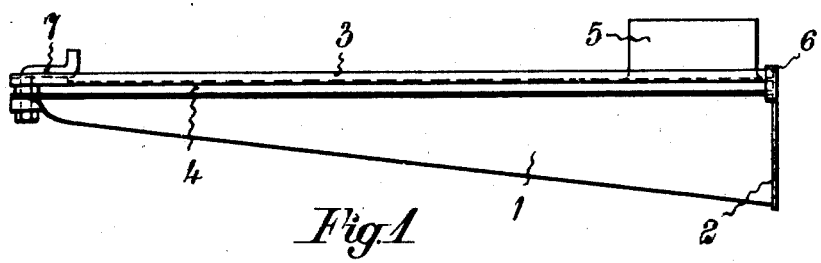
Figure 1 is an elevation of the one form of embodiment.
Figure 2:
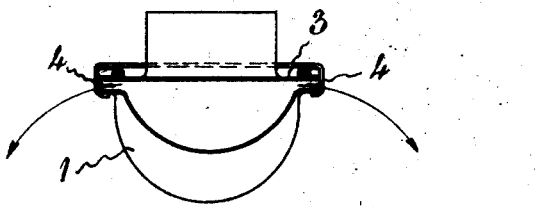
Fig. 2 is a transversal section of the device according to Fig. 1.
Figure 5:
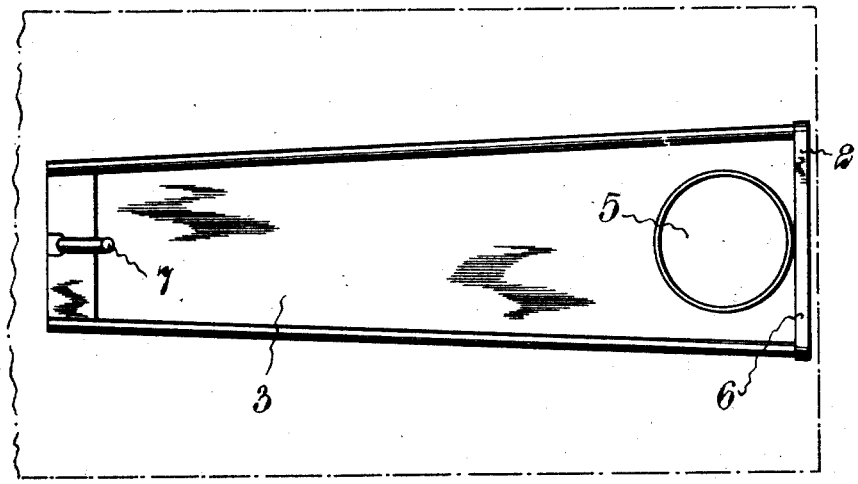
Fig. 5 is a top view of the device according to Fig. 1.
Figure 6:
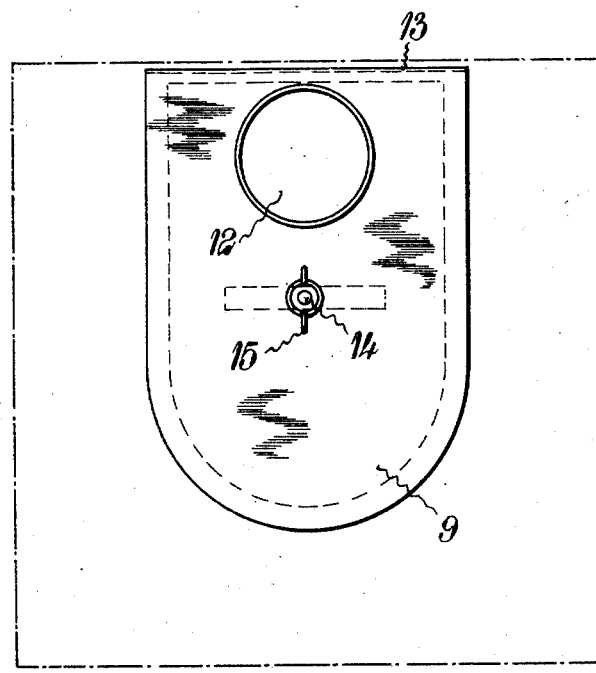
Fig. 6 is a top view of the device according to Fig. 3.

According to Figs. 1, 2 and 5 the foam-destroyer is of extending form in agreement with the shape of the receptacle which is shown with dash-dotted lines in Fig. 5. The device consists of a lower extending cup or shovel shaped part 1 which is deeper at its one end and here closed by means of a transversal wall member 2, while its deepness and width gradually diminishes towards its other end. Above this cup or shovel is arranged a cover 3 of substantially the same form as the horizontal cross sectional area of the shovel. The cover is placed at a short distance above the shovel, so that between the edges of the cover and the shovel there are formed narrow slots 4 through which the milk runs out from the shovel in a thin skin as indicated with the arrows shown in Fig. 2. The milk is fed into the device through an inlet 5 attached to the cover 3, and it is to be observed that the inlet is preferably placed above the deepest portion of shovel 1.

In a preferred form there is no discharge slot in or above the wall member 2, but otherwise the slot is meant to extend throughout the entire length of the edges of the cover. The cover ought to be easily removable for cleaning purposes, and in a preferred form the cover is fastened in such a manner that the edge of the cover near the wall member 2 is pushed under a flange 6 attached to the shovel, while the opposite end of the cover is removably attached to the shovel by means of a rotatable locking bolt 7.

The form of embodiment as illustrated in Figs. 3, 4 and 6 is intended for use in a receptacle having substantially square form as indicated with dash-dotted lines in Fig. 6

Also in this case the device consists of a lower shovel like part 8 provided with a cover 9 spaced above the shovel at a short distance so as to form a narrow slot 10 between the said parts. The shovel is here also provided with a transversal wall member 11 at the deepest end of the shovel, where also the inlet 12 is arranged on the cover.

The cover 9 in this case is provided with a flange 13 bent down so as to eliminate a slot in or above the end wall 11, and it is fastened to the shovel by means of a screw 14 fixed to the latter and a wing nut 15, a counter nut 16 being provided under the cover so as to be able to regulate the depth of the slots 10.

The foam-destroyer is further provided with discharge openings below the slots 10, and the said openings are constituted by a row of small holes 17 in the lower part 8, substantially equidistantly spaced and in a line substantially parallel with the edges of the shovel 8. In this case the milk will be discharged in two thin layers one on top of the other as indicated with the arrows shown in Fig. 4. A similar row of holes may of course also be arranged in the form of embodiment as illustrated in Figs. 1, 2 and 5, and further in both forms of embodiment more than one row of holes may be provided for, so that the milk will be discharged in more than two layers.

The discharge area should in all forms of embodiment be substantially the same as the cross sectional area of the inlets 5 or 12, so that any substantial increased pressure is not present in the hollowness of the shovel.

In addition to the two forms of embodiment as shown and described several other forms may of course be employed. If, for instance, the receptacle which is to receive the milk is circular or oval, the foam-destroyer may also be made circular or oval, and the shovel should in this case have a somewhat similar form, the inlet being situated at the center of the cover.

It is naturally not necessary that the milk be fed through the cover, although such arrangement is preferred for many reasons, especially if the device is to be used in connection with dairy scales, and the inlet may also be arranged in the transversal end wall 2 or 11 or even at some portion of the shovel.

The invention may further be modified in such a manner that the narrow slot between the cover and the shovel is replaced by a row of holes (such as 17, Fig. 3), that is to say the cover may be close to the shovel and the latter be provided near its upper edges by a row or several rows of holes. Further the rows of holes may in all forms of embodiment be replaced by slots, some stays being left between the slots for giving the device stability. In the same way as the device according to the invention may be provided with one continuous slot and one or several rows of holes, it may also be provided with several rows of holes only or several rows of slots only, and the chief point therefore is that the milk is brought to run out of the device in one or more thin layers which when rows of holes are used naturally will not be continuous until the different jets meet one another at a short distance away from the discharge openings.

The foam-destroyer is intended to be attached by means of the inlet socket to the end of a discharge tube, but the arrangements in this respect are outside of the invention and may vary according to demand and requirement.

What I claim and desire to secure by Letters Patent is:

1. A foam-destroying device comprising a lower cup shaped member, an upper cover member, an inlet, means for delivering the material under pressure through said inlet, and at least one discharge opening near the upper edges of the cup shaped member, the discharge opening having a shape, so that the medium in the cup shaped member is discharged materially beyond said cup shaped member and substantially horizontally in the form of a thin film.

2. A foam-destroying device comprising a lower cup shaped member, an upper cover member, an inlet, means for delivering material under pressure through said inlet, and a narrow discharge slot near the upper edges of the cup shaped member formed to discharge the material as a substantially horizontal film and materially beyond the cup shaped member.

3. A foam-destroying device comprising a lower cup shaped member, an upper cover member and an inlet, means for delivering material under pressure through said inlet, the cover member spaced at a short distance above the cup shaped member, so as to form a narrow discharge slot between the two said members substantially throughout the entire length of the edge of the cup shaped member, said discharge slot serving to discharge the material as a substantially horizontal film and materially beyond the edge of the cup shaped member.

4. A foam-destroying device as claimed in claim 3, in which the cover member and the cup shaped member are attached to each other by adjustable means by which the distance between the two said members may be regulated.

5. A foam-destroying device adapted to deliver the material into a receptacle and formed to initially receive the material under pressure, said device having a discharge opening through which the material is delivered as a substantially horizontal film and throughout an area substantially embracing the area of the receptacle, whereby the film of material covers the froth-forming area in the receptacle to cause the foam otherwise forming to be pressed down into the liquid in the receptacle.

6. A foam-destroying device comprising a lower cup-shaped receptacle and an upper cover member removably arranged thereon in a spaced relation so as to form a horizontally directed discharge slot at the upper part of the device, means for admitting the foam-mixed fluid under pressure into the chamber formed by the receptacle and its cover so as to cause the fluid to be discharged through such discharge slot in the form of a film which is substantially horizontal nearest to the discharge slot.

7. A foam-destroying device comprising a lower cup-shaped receptacle and an upper cover member removably arranged thereon in a spaced relation so as to form a horizontally directed discharge slot extending substantially throughout the entire length of the edge of the cup-shaped receptacle, means for adjusting the interspace between the cover and the receptacle, means for admitting the foam-mixed fluid under pressure into the chamber formed by the receptacle and its cover so as to cause the fluid to be discharged through said discharge slot in the form of a film which is substantially horizontal nearest to the discharge slot.

In testimony whereof, I have signed my name to this specification.

MAGNUS KRISTOFFERSSON.